(12) United States Patent
Bai et al.

(10) Patent No.: US 9,926,482 B1
(45) Date of Patent: Mar. 27, 2018

(54) DEEP-WELL POLYSULFONATE DRILLING FLUID AND PREPARATION METHOD THEREOF

(71) Applicant: Southwest Petroleum University, Chengdu (CN)

(72) Inventors: Yang Bai, Chengdu (CN); Pingya Luo, Chengdu (CN); Ling Lin, Chengdu (CN); Dachuan Liang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 15/795,792

(22) Filed: Oct. 27, 2017

Related U.S. Application Data

(63) Continuation of application No. PCT/CN2017/100133, filed on Jul. 12, 2017.

(30) Foreign Application Priority Data

Jul. 12, 2017 (CN) .......................... 2017 1 0565459

(51) Int. Cl.
| | | |
|---|---|---|
| *C09K 8/28* | (2006.01) | |
| *C09K 8/12* | (2006.01) | |
| *C09K 8/584* | (2006.01) | |
| *C09K 8/74* | (2006.01) | |
| *C09K 8/24* | (2006.01) | |
| *E21B 21/06* | (2006.01) | |
| *C09K 8/16* | (2006.01) | |

(52) U.S. Cl.
CPC .................. *C09K 8/24* (2013.01); *C09K 8/16* (2013.01); *E21B 21/062* (2013.01)

(58) Field of Classification Search
CPC ............ C09K 8/16; C09K 8/24; E21B 21/062
USPC .......................... 507/119, 134, 220, 252, 269
See application file for complete search history.

(56) References Cited

U.S. PATENT DOCUMENTS

| | | | | |
|---|---|---|---|---|
| 3,956,140 A | * | 5/1976 | Nahm | ....................... C09K 8/24 166/293 |
| 2013/0079257 A1 | * | 3/2013 | Lin | ......................... C09K 8/035 507/108 |

* cited by examiner

*Primary Examiner* — Aiqun Li
(74) *Attorney, Agent, or Firm* — Calfee Halter & Griswold LLP

(57) ABSTRACT

The present invention relates to the deep-well drilling fluid field, and discloses a deep-well polysulfonate drilling fluid and a method for preparing the deep-well polysulfonate drilling fluid. The drilling fluid contains water, bentonite, sodium carbonate, sulfomethylated phenolic resin, sulfonated lignite, halide salt, filtrate reducer, sodium polyacrylate, sodium bisulfite and barite, wherein, based on 100 parts by weight of water, the content of the bentonite is 3.5-5 parts by weight, the content of the sodium carbonate is 0.15-0.35 parts by weight, the content of the sulfomethylated phenolic resin is 6-8 parts by weight, the content of the sulfonated lignite is 6-8 parts by weight, the content of the halide salt is 7.5-12 parts by weight, the content of the filtrate reducer is 0.5-1.2 parts by weight, the content of the sodium polyacrylate is 0.8-1.7 parts by weight, the content of the sodium bisulfite is 3-5 parts by weight, and the content of the barite is 250-300 parts by weight; the drilling fluid has favorable properties such as low viscosity and low HTHP water loss, etc.

16 Claims, No Drawings

DEEP-WELL POLYSULFONATE DRILLING FLUID AND PREPARATION METHOD THEREOF

CROSS REFERENCE TO RELATED APPLICATIONS

This application is a continuation of and claims priority to PCT/CN2017/100133 filed on Jul. 12, 2017, and Chinese Application No. 201710565459.X, filed on Jul. 12, 2017, entitled "Deep-Well Polysulfonate Drilling Fluid and Preparation Method Thereof", which is specifically and entirely incorporated by reference.

FIELD OF THE INVENTION

The present invention relates to the deep-well drilling fluid field, in particular to a deep-well polysulfonate drilling fluid and a method for preparing the deep-well polysulfonate drilling fluid. The deep-well polysulfonate drilling fluid is especially suitable for drilling of deep wells and extra-deep wells.

BACKGROUND OF THE INVENTION

In recent years, as more exceptional wells, extra-deep wells, and complex wells are drilled, the drilling of deep wells and extra-deep wells has been regarded as an important aspect in the future development of the drilling industry. Higher requirements have been put forward for the drilling fluid technology, and the existing drilling fluid additives can't fully meet the demand of the development of the drilling fluid technology anymore. Since there are more technical difficulties in drilling of deeper wells, in all countries around the world, the drilling depth and speed are deemed as important indicators of the well drilling technology. It is proven in practice that the quality of extra-deep well drilling fluids is of vital importance for the success of drilling of deep wells and extra-deep wells, drilling speed, exploration of deep oil and gas resources, and drilling cost. Viewed from the present situation of the research on deep well and extra-deep well drilling fluids, common deep well and extra-deep well drilling fluids are categorized into two broad categories: water-based drilling fluids and oil-based drilling fluids. Though oil-based drilling fluids have advantages such as resistant to high temperature, resistant to salinity and calcium contamination, and beneficial for well wall stability, etc. over water-based drilling fluids, they involve much higher preparation costs, may bring severe impacts on the ecological environment in the vicinity of the well site, and usually attain lower penetration rates than water-based drilling fluids. Water-based drilling fluids have advantages such as low cost, simple preparation, disposal and maintenance, wide availability and varieties of additives, and easy control of properties, etc.; therefore, water-based drilling fluids are dominant in China. In view of the shortcomings of water-based drilling fluids, it is a technical key to develop a water-based drilling fluid that has high performance and is stable for drilling of deep wells and extra-deep wells, as well as a technical challenge in drilling of deep wells and extra-deep wells in China and foreign countries.

The development from the tri-sulfonate drilling fluid developed in the early 1970s to the present polysulfonate drilling fluid systems is an inexorable development trend of deep-well drilling fluids. The majority or even the vast majority of deep-well drilling fluid systems can't function without polysulfonates. The action principle of polysulfonates is mainly resistance to damages of high temperature to the additives, and relevant additives are based on a prerequisite of improving the temperature-resistance capability and salinity-resistance capability. The temperature-resistance capability mainly lies in resistance to high temperature degradation.

However, existing deep-well high-temperature drilling fluids have the following major problems:

(1) The filtrate loss and wall building property of the high-temperature drilling fluid system is difficult to control: Since additives that contain chromium element were forbidden to use, sharply aggravated HTHP filtrate loss and aging of deep-well high-temperature drilling fluid systems (especially brine drilling fluids) has become a universal phenomenon, and that phenomenon is more prominent as the temperature and salinity increase. Therefore, developing effective temperature-resistant and salinity-resistant filtrate reducers (for reducing HTHP filtrate loss) is a key task in the drilling fluid field as well as a core problem for establishing high-temperature brine drilling fluid systems. In addition, after the HTHP filtrate loss and thermostability problems of low-density brine drilling fluids are solved, when such low-density brine drilling fluids are weighted to 1.50 g/cm$^3$ or higher density, the HTHP filtrate loss will be increased severely; when the density is increased to be higher than 2.0 g/cm$^3$, the HTHP filtrate loss will be multiplied. Consequently, more kinds of filtrate reducers have to be used, and the doses of the filtrate reducers have to be increased further. As a result, the kinds and doses of high-temperature filtrate reducers for drilling fluid are increased greatly, and the approaches for development of temperature-resistant and salinity-resistant filtrate reducers are limited.

(2) The rheological property of high-density drilling fluid systems are difficult to control: To ensure high-temperature drilling fluids have low HTHP filtrate loss, the kinds and doses of high-temperature filtrate reducers for drilling fluid have to be increased greatly in the systems. Consequently, the viscosity of the base mud of drilling fluid is increased severely; in addition, owing to the existence of a large quantity of barite granules after the base mud is weighted, the viscosity is further increased severely. If the quantity of soil in the drilling fluid is controlled improperly, the viscosity and shearing strength of the drilling fluid will be increased after the drilling fluid is aged at a high temperature, resulting in loss of fluidity (gelatinization and setting at high temperature). In addition, the temperature-resistant and salinity-resistant viscosity reducers being developed continuously mainly act on clay, but the content of clay in high-density drilling fluid systems is very limited. Consequently, it is difficult to attain a good viscosity breaking effect.

Though extensive researches on temperature-resistant and salinity-resistant drilling fluids have been made in China presently, but existing high temperature-resistant high-density brine drilling fluid systems still can't fully meet the performance expectations. Therefore, the "Research on High-Density Drilling Fluid Systems (≤2.30 g/cm$^3$) Resistant to 200° C. or Higher Temperature" has been listed as a key special research task and subject in "the Thirteenth Five Year Plan" of the state for development of the petroleum and gas industry.

Deep-well high-density water-based drilling fluid systems become more complex as the temperature is increased, the kinds of additives are increased, and the doses of the additives are increased; especially, it has become a consensus in the mud industry in China and foreign countries that it is very difficult to control the HTHP filtrate loss of a drilling fluid to be lower than 15 ml after the drilling fluid is aged at a high temperature above 180° C. and a variety of filtrate reducers have to be used and the doses of the filtrate reducers have to be increased greatly to attain that goal.

Owing to the fact that there are many kinds of additives for high-temperature brine drilling fluids that work at 180° C. or higher temperatures, the doses of the additives are very high and the systems are very complex, it is difficult handle the additives once their performance become instable during use. The results of statistics in foreign countries have demonstrate that the service temperature of a drilling fluid is related with the consumption of additives (organic); specifically, when the temperature is increased from 93° C. to 121° C., the consumption of the additives will be increased by 50%; when the temperature is increased from 121° C. to 148.9° C., the consumption of the additives will be increased by 100%; when the temperature is increased from 148.9° C. to 176.7° C., the consumption of the additives will be increased by 100%.

Likewise, the high-temperature high-density brine drilling fluids produced domestically in China also have the characteristics described above. The results of statistics have indicated that usually 10 kinds of organic additives exist in a high-density (2.00 g/cm$^3$) under-saturated brine drilling fluid system that is resistant to 200° C. high temperature, the total dose of filtrate reducers is higher than 25%, and the total dose of organic additives in the system is even much higher than 30%.

SUMMARY OF THE INVENTION

To solve the common problems in the high-temperature high-density brine drilling fluids in China, i.e., many kinds of additives are used, the doses of the additives are very high, the HTHP wall building capacity and rheological property are difficult to control after the drilling fluid is aged, and the preparation cost and maintenance cost are very high, the present invention provides a deep-well polysulfonate drilling fluid and a method for preparing the deep-well polysulfonate drilling fluid. The deep-well polysulfonate drilling fluid solves the problems of existing high-density drilling fluids, including high viscosity, high HTHP filtrate loss, and difficulties in control.

To solve the above-mentioned problems in the prior art, the present invention provides a deep-well polysulfonate drilling fluid, which contains water, bentonite, sodium carbonate, sulfomethylated phenolic resin, sulfonated lignite, halide salt, filtrate reducer, sodium polyacrylate, sodium bisulfite and barite, wherein, based on 100 parts by weight of water, the content of the bentonite is 3.5-5 parts by weight, the content of the sodium carbonate is 0.15-0.35 parts by weight, the content of the sulfomethylated phenolic resin is 6-8 parts by weight, the content of the sulfonated lignite is 6-8 parts by weight, the content of the halide salt is 7.5-12 parts by weight, the content of the filtrate reducer is 0.5-1.2 parts by weight, the content of the sodium polyacrylate is 0.8-1.7 parts by weight, the content of the sodium bisulfite is 3-5 parts by weight, and the content of the barite is 250-300 parts by weight.

Preferably, based on 100 parts by weight of water, the content of the bentonite is 4-4.8 parts by weight, the content of the sodium carbonate is 0.2-0.24 parts by weight, the content of the sulfomethylated phenolic resin is 6.5-7.8 parts by weight, the content of the sulfonated lignite is 6.5-7.8 parts by weight, the content of the halide salt is 9-10.8 parts by weight, the content of the filtrate reducer is 0.75-0.9 parts by weight, the content of the sodium polyacrylate is 1.2-1.44 parts by weight, the content of the sodium bisulfite is 3.5-4.2 parts by weight, and the content of the barite is 260-290 parts by weight.

Preferably, the filtrate reducer is acrylamide/dimethyldiallyl ammonium chloride bipolymer, and/or acrylamide/dimethyldiallyl ammonium chloride/2-acrylamide-2-methyl propanesulfonic acid terpolymer.

More preferably, the filtrate reducer is a composition of acrylamide/dimethyldiallyl ammonium chloride bipolymer and acrylamide/dimethyldiallyl ammonium chloride/2-acrylamide-2-methyl propanesulfonic acid terpolymer, and the weight ratio of the acrylamide/dimethyldiallyl ammonium chloride bipolymer to the acrylamide/dimethyldiallyl ammonium chloride/2-acrylamide-2-methyl propanesulfonic acid terpolymer is (0.6-0.8):1.

Preferably, the halide salt is sodium chloride and/or potassium chloride.

More preferably, the halide salt is a composition of sodium chloride and potassium chloride, and the weight ratio of the sodium chloride to the potassium chloride is (0.6-0.96):1.

Preferably, the barite is barite A and/or barite B, the grain size of the barite A is 50-70 μm, and the grain size of the barite B is 1-1.2 μm.

More preferably, the barite is a composition of barite A and barite B, and the weight ratio of the barite A to the barite B is (1-4):1.

Preferably, the pH of the deep-well polysulfonate drilling fluid is 8-9, and the density of the deep-well polysulfonate drilling fluid is 2.30-2.45 g/cm$^3$.

In another aspect, the present invention further provides a method for preparing a deep-well polysulfonate drilling fluid, which comprises the following steps:

(1) mixing bentonite and sodium carbonate through a first mixing process and then treating the mixture by prehydration;

(2) mixing the mixture obtained by prehydration in the step (1) with a filtrate reducer and sodium polyacrylate through a second mixing process, and then mixing the resultant mixture with a halide salt and sodium bisulfite through a third mixing process;

(3) mixing the mixture obtained in the step (2) with sulfomethylated phenolic resin and sulfonated lignite through a fourth mixing process;

Wherein, based on 100 parts by weight of water, the dose of the bentonite is 3.5-5 parts by weight, the content of the sodium carbonate is 0.15-0.35 parts by weight, the dose of the sulfomethylated phenolic resin is 6-8 parts by weight, the dose of the sulfonated lignite is 6-8 parts by weight, the dose of the halide salt is 7.5-12 parts by weight, the dose of the filtrate reducer is 0.5-1.2 parts by weight, the dose of the sodium polyacrylate is 0.8-1.7 parts by weight, the content of the sodium bisulfite is 3-5 parts by weight, and the dose of the barite is 250-300 parts by weight.

Preferably, based on 100 parts by weight of water, the dose of the bentonite is 4-4.8 parts by weight, the content of the sodium carbonate is 0.2-0.24 parts by weight, the dose of the sulfomethylated phenolic resin is 6.5-7.8 parts by weight, the dose of the sulfonated lignite is 6.5-7.8 parts by weight, the dose of the halide salt is 9-10.8 parts by weight, the dose of the filtrate reducer is 0.75-0.9 parts by weight, the dose of the sodium polyacrylate is 1.2-1.44 parts by weight, the content of the sodium bisulfite is 3.5-4.2 parts by weight, and the dose of the barite is 260-290 parts by weight.

Preferably, the filtrate reducer is acrylamide/dimethyldiallyl ammonium chloride bipolymer, and/or acrylamide/dimethyldiallyl ammonium chloride/2-acrylamide-2-methyl propanesulfonic acid terpolymer.

More preferably, the filtrate reducer is a composition of acrylamide/dimethyldiallyl ammonium chloride bipolymer and acrylamide/dimethyldiallyl ammonium chloride/2-acrylamide-2-methyl propanesulfonic acid terpolymer, and the weight ratio of the acrylamide/dimethyldiallyl ammonium chloride bipolymer to the acrylamide/dimethyldiallyl ammonium chloride/2-acrylamide-2-methyl propanesulfonic acid terpolymer is (0.6-0.8):1.

Preferably, the halide salt is sodium chloride and/or potassium chloride.

More preferably, the halide salt is a composition of sodium chloride and potassium chloride, and the weight ratio of the sodium chloride to the potassium chloride is (0.6-0.96):1.

Preferably, the barite is barite A and/or barite B, the grain size of the barite A is 50-70 μm, and the grain size of the barite B is 1-1.2 μm.

More preferably, the barite is a composition of barite A and barite B, and the weight ratio of the barite A to the barite B is (1-4):1.

Preferably, in the step (1), the conditions of the first mixing process include: temperature: 50-70° C., stirring rate: 550-650 r/min., and time: 30-45 min; the conditions of the prehydration treatment include: temperature: 50-70° C., stirring rate: 550-650 r/min., and time: 23-25 h;

Wherein, in the step (2), the conditions of the second mixing process include: temperature: 60-70° C., stirring rate: 950-1,000 r/min., and time: 50-70 min.; and the conditions of the third mixing process include: temperature: 60-70° C., stirring rate: 550-650 r/min., and time: 50-70 min.;

Wherein, in the step (3), the conditions of the fourth mixing process include: temperature: 60-70° C., stirring rate: 550-650 r/min., and time: 30-40 min.

In another aspect, the present invention further provides a deep-well polysulfonate drilling fluid prepared with the above-mentioned preparation method.

Preferably, the pH of the deep-well polysulfonate drilling fluid is 8-9, and the density of the deep-well polysulfonate drilling fluid is 2.30-2.45 g/cm$^3$.

With the technical scheme described above, the deep-well polysulfonate drilling fluid provided in the present invention utilizes a high-temperature crosslinking effect of additives as a basis, uses NaHSO$_3$ as an initiator for moderate crosslinking at high temperature, and is composited with barite powder in different grain sizes to solve the problems of high-density drilling fluids including high viscosity, high HTHP filtrate loss, and difficulties in control; the temperature-resistant and salinity-resistant high-density drilling fluid developed in the present invention has favorable properties (low HTHP filtrate loss, high rheological property), require fewer kinds of additives and greatly decreased doses of the additives; moreover, the deep-well polysulfonate drilling fluid system has precious outstanding properties, including low viscosity (apparent viscosity (AV)=61-63 mPa·s, plastic viscosity (PV)=46-47 mPa·s) and low HTHP filtrate loss (≤15 ml), etc., after the deep-well polysulfonate drilling fluid system is aged.

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

In the present invention, the terms "apparent viscosity", "plastic viscosity", and "yield point" are defined as follows according to the provisions in GB3102.3-1993 "Quantities and Units of Mechanics":

Apparent viscosity: It is also known as effective viscosity, refers to the ratio of shearing stress to velocity gradient of the drilling fluid at a certain velocity gradient, and is denoted by "AV", in unit of mPa·s.

Plastic viscosity: It is the sum of various internal friction forces between solid grains, between solid grains and liquid molecules, and between liquid molecules in the drilling fluid in laminar flow state, and is denoted by "PV", in unit of mPa·s or cP, wherein, 1 mPa·s=1 cP.

Yield point: It reflects the magnitude of interacting forces between clay grains and high-polymer molecules in the drilling fluid in a laminar flow state, i.e., the capability of forming mesh structures in the drilling fluid, and is denoted by "YP" or "T0", in unit of Pa.

Gel strength: It reflects the intensity of the gel mesh structures in the drilling fluid in a static state. The gel strength is denoted by Greek letter θ, and its legal unit of measurement is pascal (Pa). The magnitude of gel strength depends on the quantity of structural chains and the strength of the individual structures in unit volume of fluid. The gel strength will be increased as the structural sequences in the fluid become stable gradually and the development of the structures becomes complete. Therefore, the gel strength must be measured twice to evaluate the rate of increase of gel strength; specifically, the gel strength must be measured at 10 s and 10 min. in static state as specified in the API (American Petroleum Institute) standard, and the measured results are referred to as initial gel strength and ten-min. gel strength respectively. The magnitude of gel strength reflects the rock powder suspension capability. Especially, in weighted mud, since the density of the weighting agent (e.g., barite) is high, once the mud pump stops and the fluid circulation is interrupted, the coarse particles of rock cuttings will settle quickly, resulting in a buried drill accident in the borehole. Therefore, the gel strength shall be maintained at a certain value.

The present invention provides a deep-well polysulfonate drilling fluid, which contains water, bentonite, sodium carbonate, sulfomethylated phenolic resin, sulfonated lignite, halide salt, filtrate reducer, sodium polyacrylate, sodium bisulfite and barite, wherein, based on 100 parts by weight of water, the content of the bentonite may be 3.5-5 parts by weight, the content of the sodium carbonate may be 0.15-0.35 parts by weight, the content of the sulfomethylated phenolic resin may be 6-8 parts by weight, the content of the sulfonated lignite may be 6-8 parts by weight, the content of the halide salt may be 7.5-12 parts by weight, the content of the filtrate reducer may be 0.5-1.2 parts by weight, the content of the sodium polyacrylate may be 0.8-1.7 parts by weight, the content of the sodium bisulfite may be 3-5 parts by weight, and the content of the barite may be 250-300 parts by weight.

According to the present invention, the object of the present invention can be attained to some extent as long as the deep-well polysulfonate drilling fluid contains water, bentonite, sodium carbonate, sulfomethylated phenolic resin, sulfonated lignite, halide salt, filtrate reducer, sodium polyacrylate, sodium bisulfite and barite, and the constituents are in line with the proportional relation described above.

The inventor of the present invention has found in the research: though the object of the present invention can be attained as long as the deep-well polysulfonate drilling fluid contains water, bentonite, sodium carbonate, sulfomethylated phenolic resin, sulfonated lignite, halide salt, filtrate reducer, sodium polyacrylate, sodium bisulfite and barite and the constituents are in line with the proportional relation described above, preferably, based on 100 parts by weight of water, the content of the bentonite is 4-4.8 parts by weight, the content of the sodium carbonate is 0.2-0.24 parts by weight, the content of the sulfomethylated phenolic resin is 6.5-7.8 parts by weight, the content of the sulfonated lignite is 6.5-7.8 parts by weight, the content of the halide salt is 9-10.8 parts by weight, the content of the filtrate reducer is 0.75-0.9 parts by weight, the content of the sodium polyacrylate is 1.2-1.44 parts by weight, the content of the sodium bisulfite is 3.5-4.2 parts by weight, and the content of the barite is 260-290 parts by weight, so as to attain a better effect.

According to the present invention, there is no particular restriction on the bentonite that is used as an additive. In other words, the bentonite may be any conventional bentonite in the art; for example, the bentonite may be bentonite for drilling fluid, the main constituents of which are clay minerals that contain montmorillonite not less than 85 wt %.

According to the present invention, there is no particular restriction on the water. Tap water (clean water) may be used.

According to the present invention, the sulfomethylated phenolic resin is code-named as SMP-III, and is commercially available. The molecular weight of the sulfomethylated phenolic resin is 200,000-500,000.

According to the present invention, the code name of the sulfonated lignite (viscosity reducer) is SMC.

According to the present invention, the molecular formula of the sodium polyacrylate (viscosity reducer) is (C3H3NaO2)n, the sodium polyacrylate is commercially available, and the number-average molecular weight of it is 200,000-400,000.

There is no particular restriction on the sodium carbonate and the sodium bisulfite. They are commercially available.

According to the present invention, the filtrate reducer may be acrylamide/dimethyldiallyl ammonium chloride bipolymer, and/or acrylamide/dimethyldiallyl ammonium chloride/2-acrylamide-2-methyl propanesulfonic acid terpolymer; preferably, the filtrate reducer is a composition of acrylamide/dimethyldiallyl ammonium chloride bipolymer and acrylamide/dim ethyl diallyl ammonium chloride/2-acrylamide-2-methyl propanesulfonic acid terpolymer, and the weight ratio of the acrylamide/dimethyldiallyl ammonium chloride bipolymer to the acrylamide/dim ethyl diallyl ammonium chloride/2-acrylamide-2-methyl propanesulfonic acid terpolymer may be (0.6-0.8):1; preferably is (0.65-0.75):1; in addition, the acrylamide/dimethyldiallyl ammonium chloride bipolymer (AM/DMDAAC) and the acrylamide/dimethyl diallyl ammonium chloride/2-acrylamide-2-methyl propanesulfonic acid terpolymer (AM/DMDAAC/AMPS) may be synthesized and prepared by the inventor through copolymerization of free radicals in a water solution; the synthesizing method is described as follows.

According to the present invention, the method for synthesizing the acrylamide/dimethyldiallyl ammonium chloride bipolymer comprises the following steps:

(1) mixing AM, DMDAAC, and deionized water;
(2) mixing the mixture obtained in the step (1) with an initiator;
(3) extracting the product obtained in the step (2) with ethanol, cutting the extracted product into pieces and filtering it, and then drying it in a vacuum oven.

Wherein, in the step (1), the mixing conditions may be: the temperature is 49-51° C.; the stirring rate is not restricted particularly, and may be selected by those skilled in the art conventionally; for example, the stirring rate may be 280-320 r/min.; in addition, nitrogen is charged for deoxidization while the solution is stirred; the mixing time may be 19-21 min.;

Wherein, in the step (2), the initiator may be a redox system; for example, the initiator may be one or more of 2,2'-azabis(2-imidazoline)dihydrochloride (VA-044), 2,2'-azobis(isobutyramidine)dihydrochloride (AIBA-2 HCl)-sodium bisulfite, ammonium persulfate-sodium bisulfite, and potassium persulfate-sodium bisulfite, preferably is ammonium persulfate-sodium bisulfite; in addition, the initiator is mixed with AM and DMDAAC at the same time after nitrogen is charged for deoxidization; moreover, preferably, the initiator may be added by dropwise adding at 0.3-05 mL/min. dropwise adding rate; and the mixing conditions may be: temperature: 49-51° C., time: 7.5-8.5 h;

Wherein, in the step (3), the drying conditions may be: temperature: 49-51° C., and time: 23-25 h; in addition, the product is milled into white powder after it is dried;

Wherein, the intrinsic viscosity number of the acrylamide/dimethyldiallyl ammonium chloride bipolymer is 370-380 mL/g, preferably is 375-378 mL/g; and Based on the total weight of the acrylamide/dimethyldiallyl ammonium chloride bipolymer, the content of the acrylamide is 75-85 wt %, and the content of the dimethyldiallyl ammonium chloride is 15-25 wt %;

Preferably, based on the total weight of the acrylamide/dimethyldiallyl ammonium chloride bipolymer, the content of the acrylamide is 78-82 wt %, and the content of the dimethyldiallyl ammonium chloride is 18-22 wt %.

By changing the doses of the AM and DMDAAC monomers and the initiator, acrylamide/dimethyldiallyl ammonium chloride (AM/DMDAAC) bipolymers different in molecular structure can be obtained, wherein, Table 1 shows the properties of bipolymers prepared with different initiators.

TABLE 1

| Initiator system | Reaction temperature | Cationic degree | Intrinsic viscosity number | Yield ratio |
|---|---|---|---|---|
| VA-044 | 45° C. | 7.73 | 281.93 | 53.87 |
| AIBA-2HCl-sodium bisulfite | 60° C. | 9.78 | 430.14 | 64.35 |
| Ammonium persulfate-sodium bisulfite | 50° C. | 10.29 | 345.65 | 84.26 |
| Potassium persulfate-sodium bisulfite | 50° C. | 10.06 | 338.47 | 73.44 |

Note: the unit of cationic degree is mol %, the unit of intrinsic viscosity number is mL·g-1, and the unit of yield ratio is %.

Note: the unit of cationic degree is mol %, the unit of intrinsic viscosity number is mL·g-1, and the unit of yield ratio is %.

According to the present invention, the method for synthesizing the acrylamide/dimethyldiallyl ammonium chloride/2-acrylamide-2-methyl propanesulfonic acid terpolymer (AM/DMDAAC/AMPS) comprises the following steps:
(1) mixing AMPS with deionized water;
(2) mixing the mixture obtained in the step (1) with AM and DMDAAC;
(3) mixing the mixture obtained in the step (2) with an initiator;
(4) extracting the product obtained in the step (3) with ethanol, cutting the extracted product into pieces and filtering it, and then drying it in a vacuum oven.

Wherein, in the step (1), the mixing conditions may be: the temperature is 29-31° C.; the stirring rate is not particularly restricted, and may be selected by those skilled in the art conventionally; for example, the stirring rate may be 180-220 r/min.; and the pH of the mixed solution may be adjusted to neutral with NaOH solution at certain concentration;

Wherein, in the step (2), the mixing conditions may be: the temperature is 49-51° C.; the stirring rate is not restricted particularly, and may be selected by those skilled in the art conventionally; in addition, nitrogen is charged for deoxidization while the solution is stirred; the mixing time may be 19-21 min.;

Wherein, in the step (3), the initiator may be a redox system; for example, the initiator may be ammonium persulfate-sodium bisulfite and potassium persulfate-sodium bisulfite, and the weight ratio of the ammonium persulfate-sodium bisulfite to the potassium persulfate-sodium bisulfite is 1:1; in addition, the initiator is mixed with AMPS, AM and DMDAAC at the same time after nitrogen is charged for deoxidization; and the mixing conditions may be: temperature: 49-51° C., time: 7.5-8.5 h; moreover, preferably, the initiator may be added to the mixture obtained in the step (2) by dropwise adding at 2.5-3.5 mL/min. dropwise adding rate and mixed with the mixture.

Wherein, in the step (4), the drying conditions may be: temperature: 49-51° C., and time: 23-25 h; in addition, the product is milled into white powder after it is dried; wherein, the intrinsic viscosity number of the acrylamide/dimethyldiallyl ammonium chloride/2-acrylamide-2-methyl propanesulfonic acid terpolymer is 340-350 mL/g, preferably is 345-348 L/g; and Based on the total weight of the acrylamide/dimethyldiallyl ammonium chloride/2-acrylamide-2-methyl propanesulfonic acid terpolymer, the content of the acrylamide is 50-65 wt %, the content of the dimethyldiallyl ammonium chloride is 12-22 wt %, and the content of the 2-acrylamide-2-methyl propanesulfonic acid is 13-38 wt %;

Preferably, based on the total weight of the acrylamide/dimethyldiallyl ammonium chloride/2-acrylamide-2-methyl propanesulfonic acid terpolymer, the content of the acrylamide is 55-60 wt %, the content of the dimethyldiallyl ammonium chloride is 15-20 wt %, and the content of the 2-acrylamide-2-methyl propanesulfonic acid is 20-30 wt %.

By changing the doses of the AMPS, AM and DMDAAC monomers and the initiator, acrylamide/dimethyldiallyl ammonium chloride/2-acrylamide-2-methyl propanesulfonic acid (AM/DMDAAC/AMPS) terpolymers different in molecular structure can be obtained.

According to the present invention, the halide salt may be sodium chloride and/or potassium chloride; preferably, the halide salt is a composition of sodium chloride and potassium chloride, and the weight ratio of the sodium chloride to the potassium chloride may be (0.6-0.96):1, preferably is (0.70-0.8):1.

According to the present invention, the barite (weighting agent) may be barite A and/or barite B, the grain size of the barite A may be 50-70 μm, and the grain size of the barite B may be 1-1.2 μm; preferably, the barite is a composition of barite A and barite B, and the weight ratio of the barite A to the barite B may be (1-4):1, preferably is (1.5-4):1; in addition, in the present invention, the main constituent in the barite A and the barite B is BaSO4, which is to way, the barite A may be BaSO4 in grain size of 50-70 μm, and the barite B may be BaSO4 in grain size of 1-1.2 μm.

According to the present invention, the pH of the deep-well polysulfonate drilling fluid may be 8-9; preferably, the pH of the deep-well polysulfonate drilling fluid is 8.4-8.6. Moreover, in the present invention, there is not particular restriction on the reagent for adjusting the pH of the deep-well polysulfonate drilling fluid. The reagent can be selected conventionally in the art. For example, one or more of sodium hydroxide, sodium bicarbonate and calcium hydroxide may be used if the pH of the deep-well polysulfonate drilling fluid is to be increased; diluted hydrochloric acid or acid salt may be used if the pH of the deep-well polysulfonate drilling fluid is to be decreased.

According to the present invention, the density of the deep-well polysulfonate drilling fluid may be 2.30-2.45 g/cm3, preferably is 2.35-2.42 g/cm3. In the present invention, the density of the deep-well polysulfonate drilling fluid may be increased by adjusting the total dose of the barite.

In another aspect, the present invention further provides a method for preparing a deep-well polysulfonate drilling fluid, which comprises the following steps:
(1) mixing bentonite and sodium carbonate through a first mixing process and then treating the mixture by prehydration;
(2) mixing the mixture obtained by prehydration in the step (1) with a filtrate reducer and sodium polyacrylate through a second mixing process, and then mixing the resultant mixture with a halide salt and sodium bisulfite through a third mixing process;
(3) mixing the mixture obtained in the step (2) with sulfomethylated phenolic resin and sulfonated lignite through a fourth mixing process;

Wherein, based on 100 parts by weight of water, the dose of the bentonite may be 3.5-5 parts by weight, the content of the sodium carbonate may be 0.15-0.35 parts by weight, the dose of the sulfomethylated phenolic resin may be 6-8 parts by weight, the dose of the sulfonated lignite may be 6-8 parts by weight, the dose of the halide salt may be 7.5-12 parts by weight, the dose of the filtrate reducer may be 0.5-1.2 parts by weight, the dose of the sodium polyacrylate may be 0.8-1.7 parts by weight, the content of the sodium bisulfite may be 3-5 parts by weight, and the dose of the barite may be 250-300 parts by weight.

According to the present invention, the object of the present invention can be attained to some extent as long as the bentonite and sodium carbonate are prehydrated and the sulfomethylated phenolic resin, sulfonated lignite, halide salt, filtrate reducer, sodium polyacrylate, sodium bisulfite and barite are mixed in sequence with the prehydrated mixture in the preparation process of the deep-well polysulfonate drilling fluid and the constituents are in line with the above-mentioned proportional relation.

The inventor of the present invention has found in the research: though the object of the present invention can be attained as long as the bentonite and sodium carbonate are prehydrated and the sulfomethylated phenolic resin, sulfonated lignite, halide salt, filtrate reducer, sodium polyacrylate, sodium bisulfite and barite are mixed in sequence with the prehydrated mixture and the constituents are in line with the above-mentioned proportional relation, preferably, based on 100 parts by weight of water, the dose of the bentonite is 4-4.8 parts by weight, the content of the sodium carbonate is 0.2-0.24 parts by weight, the dose of the sulfomethylated phenolic resin is 6.5-7.8 parts by weight, the dose of the sulfonated lignite is 6.5-7.8 parts by weight, the dose of the halide salt is 9-10.8 parts by weight, the dose of the filtrate reducer is 0.75-0.9 parts by weight, the dose of the sodium polyacrylate is 1.2-1.44 parts by weight, the content of the sodium bisulfite is 3.5-4.2 parts by weight, and the dose of the barite is 260-290 parts by weight, so as to attain a better effect.

According to the present invention, there is no particular restriction on the bentonite that is used as an additive. In other words, the bentonite may be any conventional bentonite in the art; for example, the bentonite may be bentonite for drilling fluid, the main constituents of which are clay minerals that contain montmorillonite not less than 85 wt %.

According to the present invention, there is no particular restriction on the water. Tap water (clean water) may be used.

According to the present invention, the sulfomethylated phenolic resin is code-named as SMP-III, and is commercially available. The molecular weight of the sulfomethylated phenolic resin is 200,000-500,000.

According to the present invention, the code name of the sulfonated lignite (viscosity reducer) is SMC.

According to the present invention, the molecular formula of the sodium polyacrylate (viscosity reducer) is (C3H3NaO2)n, the sodium polyacrylate is commercially available, and the number-average molecular weight of it is 200,000-400,000.

According to the present invention, there is no particular restriction on the sodium carbonate and the sodium bisulfite. They are commercially available.

According to the present invention, the filtrate reducer may be acrylamide/dimethyldiallyl ammonium chloride bipolymer, and/or acrylamide/dimethyldiallyl ammonium chloride/2-acrylamide-2-methyl propanesulfonic acid terpolymer; preferably, the filtrate reducer is a composition of acrylamide/dimethyldiallyl ammonium chloride bipolymer and acrylamide/dimethyldiallyl ammonium chloride/2-acrylamide-2-methyl propanesulfonic acid terpolymer, and the weight ratio of the acrylamide/dimethyldiallyl ammonium chloride bipolymer to the acrylamide/dimethyldiallyl ammonium chloride/2-acrylamide-2-methyl propanesulfonic acid terpolymer may be (0.6-0.8):1; preferably is (0.65-0.75):1; in addition, the acrylamide/dimethyldiallyl ammonium chloride bipolymer (AM/DMDAAC) and the acrylamide/dimethyldiallyl ammonium chloride/2-acrylamide-2-methyl propanesulfonic acid terpolymer (AM/DMDAAC/AMPS) may be synthesized and prepared by the inventor; the synthesizing method has been described above, and will not be further detailed here.

According to the present invention, the halide salt may be sodium chloride and/or potassium chloride; preferably, the halide salt is a composition of sodium chloride and potassium chloride, and the weight ratio of the sodium chloride to the potassium chloride may be (0.6-0.96):1, preferably is (0.70-0.8): 1.

According to the present invention, the barite (weighting agent) may be barite A and/or barite B, the grain size of the barite A may be 50-70 μm, and the grain size of the barite B may be 1-1.2 μm; preferably, the barite is a composition of barite A and barite B, and the weight ratio of the barite A to the barite B may be (1-4):1, preferably is (1.5-4):1; in addition, in the present invention, the main constituent in the barite A and the barite B is BaSO4, which is to way, the barite A may be BaSO4 in grain size of 50-70 μm, and the barite B may be BaSO4 in grain size of 1-1.2 μm.

According to the present invention, in the step (1), the conditions of the first mixing process include: temperature: 50-70° C., stirring rate: 550-650 r/min., and time: 30-45 min; the conditions of the prehydration treatment include: temperature: 50-70° C., stirring rate: 550-650 r/min., and time: 23-25 h;

Wherein, in the step (2), the conditions of the second mixing process include: temperature: 60-70° C., stirring rate: 950-1,000 r/min., and time: 50-70 min.; and the conditions of the third mixing process include: temperature: 60-70° C., stirring rate: 550-650 r/min., and time: 50-70 min.;

Wherein, in the step (3), the conditions of the fourth mixing process include: temperature: 60-70° C., stirring rate: 550-650 r/min., and time: 30-40 min.

Preferably, in the step (1), the conditions of the first mixing process include: temperature: 55-65° C., stirring rate: 580-620 r/min., and time: 30-35 min; the conditions of the prehydration treatment include: temperature: 55-65° C., stirring rate: 580-620 r/min., and time: 23.5-24.5 h;

Preferably, in the step (2), the conditions of the second mixing process include: temperature: 62-68° C., stirring rate: 980-1,000 r/min., and time: 55-65 min; and the conditions of the third mixing process include: temperature: 62-68° C., stirring rate: 580-620 r/min., and time: 55-65 min.;

Preferably, in the step (3), the conditions of the fourth mixing process include: temperature: 62-68° C., stirring rate: 580-620 r/min., and time: 30-35 min.

In another aspect, the present invention further provides a deep-well polysulfonate drilling fluid prepared with the above-mentioned preparation method.

According to the present invention, the pH of the deep-well polysulfonate drilling fluid may be 8-9; preferably, the pH of the deep-well polysulfonate drilling fluid is 8.4-8.6. Moreover, in the present invention, there is not particular restriction on the reagent for adjusting the pH of the deep-well polysulfonate drilling fluid. The reagent can be selected conventionally in the art. For example, one or more of sodium hydroxide, sodium bicarbonate and calcium hydroxide may be used if the pH of the deep-well polysulfonate drilling fluid is to be increased; diluted hydrochloric acid or acid salt may be used if the pH of the deep-well polysulfonate drilling fluid is to be decreased.

According to the present invention, the density of the deep-well polysulfonate drilling fluid may be 2.30-2.45 g/cm3, preferably is 2.35-2.42 g/cm3. In the present invention, the density of the deep-well polysulfonate drilling fluid may be increased by selecting barites properly. The inventor of the present invention has found in the research: the deep-well polysulfonate drilling fluid can be weighted to 2.30-2.45 g/cm3 when the weight ratio of the barite A to the barite B is changed from 4:1 to 3:2.

According to a preferred example of the present invention, the method for preparing the deep-well polysulfonate drilling fluid comprises the following steps:

(1) first, mixing bentonite and water and stirring for 5-15 min. under conditions of 50-70° C. temperature and 550-650 r/min. stirring rate; then, mixing the mixture of bentonite and water with sodium carbonate and stirring for 25-35 min. under conditions of 50-70° C. temperature and 550-650 r/min. stirring rate; next, carrying out prehydration to obtain prehydrated soil mud, wherein, the prehydration conditions include: temperature: 50-70° C., time: 23-25 h; preferably the temperature is 55-65° C., and the time is 23.5-24.5 h;

(2) heating the prehydrated soil mud to 60-70° C., mixing the heated prehydrated soil mud with filtrate reducer and sodium polyacrylate and stirring for 50-70 min. under a condition of 950-1,000 r/min. stirring rate; then, mixing the mixture with sodium chloride, potassium chloride, and sodium bisulfite and stirring for 50-70 min. under conditions of 60-70° C. temperature and 550-650 r/min. stirring rate, and taking the resultant mixture as base mud;

(3) mixing the base mud with sulfomethylated phenolic resin and sulfonated lignite and stirring for 30-40 min. under conditions of 60-70° C. temperature and 550-650 r/min. stirring rate.

Hereunder the present invention will be detailed in examples.

The recovery efficiency is measured as per the petroleum industry standard SY-T5613-2000 "Method for Testing Physical and Chemical Properties of Shale";

The bentonite (montmorillonite) is from Xinjiang Non-metallic Minerals Xiazijie Bentonite Co., Ltd.;

The sulfomethylated phenolic resin is SMP-III sulfomethylated phenolic resin powder for drilling fluid from Chongqing Dafang Synthetic Chemical Co., Ltd.;

The sulfonated lignite is SMC sulfonated lignite from Chengdu Chuanfeng Chemical Engineering Co., Ltd.;

The halide salt, filtrate reducer, and sodium polyacrylate are from Chengdu Kelong Chemical Reagent Factory;

The barite and other raw materials are from Guizhou Micropowder Industrial Co. Ltd. (commercial submicron barium sulfate);

The acrylamide, dimethyldiallyl ammonium chloride, 2-acrylamide-2-methyl propanesulfonic acid are from Kelong Chemical Reagent Factory.

Preparation Example 1

This preparation example is provided to describe the synthesis of the acrylamide/dimethyldiallyl ammonium chloride (AM/DMDAAC) bipolymer.

(1) A magnetic stirrer is placed in a three-neck flask and a thermometer is inserted in the three-neck flask, the three-neck flask is placed in thermostat water bath and stirred continuously, the water temperature is set to 50° C., and the stirring rate is set to 300 r/min.;

(2) 20 g AM monomer is weighed, dissolved in deionized water and then the solution is loaded into the three-neck flask, 20 g DMDAAC solution is added into the three-neck flask, and then nitrogen is charged for deoxidization for 20 min. while the solution is stirred;

(3) Based on the total mass of the AM and DMDAAC monomers, 0.048 g initiator (ammonium persulfate-sodium bisulfite) is weighed and dissolved in deionized water to prepare a water solution, and then the water solution is added by dropwise adding into the three-neck flask after the deoxidization is finished, wherein, the dropwise adding rate is 0.5 mL/min., the solution is stirred to a homogenous state and held for 8 h for reaction;

(4) The product is transferred into a flask and extracted twice with ethanol, the extracted product is cut into pieces and filtered, and then dried in a vacuum oven at 50° C. for 24 h, and milled into white powder.

Result: the synthesized white powder is acrylamide/dimethyldiallyl ammonium chloride (AM/DMDAAC) bipolymer, and the intrinsic viscosity number of it is 376.24 mL/g; in addition, based on the total weight of the bipolymer, the content of acrylamide is 79.8 wt %, and the content of dimethyldiallyl ammonium chloride is 20.2 wt %.

Preparation Example 2

This preparation example is provided to describe the synthesis of the acrylamide/dimethyldiallyl ammonium chloride/2-acrylamide-2-methyl propanesulfonic acid (AM/DMDAAC/AMPS) terpolymer.

(1) 20 g AMPS is weighed and dissolved in deionized water, the solution is transferred into a three-neck flask, a magnetic stirrer is placed in the three-neck flask and a thermometer is mounted in the three-neck flask, then the three-neck flask is placed in thermostat water bath and the solution is stirred continuously, the water temperature is set to 30° C., and the stirring rate is set to 200 r/min.;

(2) A NaOH solution at certain concentration is prepared and added into the three-neck flask, to adjust the pH of the solution in the three-neck flask to neutral;

(3) 27 g AM monomer is weighed, dissolved in deionized water and then the solution is loaded into the three-neck flask, 25 g DMDAAC solution is added into the three-neck flask, and then nitrogen is charged for deoxidization for 20 min. while the solution is stirred;

(4) 0.13 g initiator (ammonium persulfate-sodium bisulfite and potassium persulfate-sodium bisulfite) is weighed and dissolved in deionized water to prepare a water solution, and then the water solution is added by dropwise adding into the three-neck flask after the deoxidization is finished, wherein, the dropwise adding rate is 3 mL/min., the solution is heated to 50° C. temperature and stirred to a homogenous state, and held for 8 h for reaction;

(5) The product is transferred into a flask and extracted twice with ethanol, the extracted product is cut into pieces and filtered, and then dried in a vacuum oven at 50° C. for 24 h, and milled into white powder.

Result: the synthesized white powder is acrylamide/dimethyldiallyl ammonium chloride/2-acrylamide-2-methyl propanesulfonic acid (AM/DMDAAC/AMPS) terpolymer, and the intrinsic viscosity number of it is 347.91 mL/g, wherein, based on the total weight of the terpolymer, the content of acrylamide is 55.9 wt %, the content of dimethyldiallyl ammonium chloride is 16.3 wt %, and the content of 2-acrylamide-2-methyl propanesulfonic acid is 27.8 wt %.

Example 1

This Example is provided to describe the method for preparing the deep-well polysulfonate drilling fluid in the present invention.

(1) 300 g tap water is taken and heated up to 65° C. temperature, 12 g bentonite for drilling fluid is added while the mixture is stirred with an electric stirrer at 600 r/min. low stirring rate for 10 min., and then 0.6 g Na2CO3 is added and the mixture is stirred for 30 min. and held for 24 h at normal temperature and normal pressure for prehydration;

(2) The prehydrated soil mud is heated up to 65° C., 3.0 g temperature-resistant and salinity-resistant zwitterionic filtrate reducer and 10.50 g sodium polyacrylate are added and the mixture is stirred for 60 min. at 1,000 r/min. high stirring rate, and then 12 g sodium chloride, 15.0 g potassium chloride and 1.050 g sodium bisulfite are added and the mixture is stirred for 60 min. at 600 r/min. low stirring rate, the product is used as base mud;

(3) 10.50 g sulfomethylated phenolic resin and 10.50 g sulfonated lignite are added into the base mud and the mixture is stirred for 30 min. at 600 r/min. stirring rate, and the pH of the drilling fluid system is adjusted to 8.5; finally, the drilling fluid system is weighted to 2.30 g/cm3 with 200 g 50-70 μm BaSO4 and 50 g 1-1.2 μm BaSO4 at a ratio of 50-70 μm BaSO4 to 1-1.2 μm BaSO4=4:1; thus, a high-density deep-well polysulfonate drilling fluid is obtained.

Result: a deep-well polysulfonate drilling fluid I is obtained, and the temperature-resistant property of it is as high as 220° C.; other properties of the deep-well polysulfonate drilling fluid after it is aged are shown in Table 2; the rolling recovery efficiency of the deep-well polysulfonate drilling fluid prepared in the example 1 is measured with an XGRL-2 roller heater, and the result is shown in Table 3.

Example 2

This Example is provided to describe the method for preparing the deep-well polysulfonate drilling fluid in the present invention.

(1) 250 g tap water is taken and heated up to 65° C. temperature, 10 g bentonite for drilling fluid is added while the mixture is stirred with an electric stirrer at 600 r/min. low stirring rate for 10 min., and then 0.5 g Na2CO3 is added and the mixture is stirred for 30 min. and held for 24 h at normal temperature and normal pressure for prehydration;

(2) The prehydrated soil mud is heated up to 65° C., 2.5 g temperature-resistant and salinity-resistant zwitterionic filtrate reducer and 8.75 g sodium polyacrylate are added and the mixture is stirred for 60 min. at 1,000 r/min. high stirring rate, and then 10 g sodium chloride, 12.5 g potassium chloride and 0.875 g sodium bisulfite are added and the mixture is stirred for 60 min. at 600 r/min. low stirring rate, the product is used as base mud;

(3) 8.75 g sulfomethylated phenolic resin and 8.75 g sulfonated lignite are added into the base mud and the mixture is stirred for 30 min. at 600 r/min. stirring rate, and the pH of the drilling fluid system is adjusted to 8.5; finally, the drilling fluid system is weighted to 2.45 g/cm3 with 180 g 50-70 μm BaSO4 and 120 g 1-1.2 μm BaSO4 at a ratio of 50-70 μm BaSO4 to 1-1.2 μm BaSO4=3:2; thus, a high-density deep-well polysulfonate drilling fluid is obtained.

Result: a deep-well polysulfonate drilling fluid II is obtained, and the temperature-resistant property of it is as high as 220° C.; other properties of the deep-well polysulfonate drilling fluid after it is aged are shown in Table 2.

Comparative Example 1

A deep-well polysulfonate drilling fluid is prepared with the same method as described in the example 1, but the doses of the additive are different, especially the total dose of the organic additives are less; specifically, based on 100 parts by weight of clean water, the dose of bentonite is 3 parts by weight, the dose of sodium carbonate is 0.2 parts by weight, the dose of sulfomethylated phenolic resin is 2.5 parts by weight, the dose of sulfonated lignite is 2.5 parts by weight, the dose of sodium chloride is 4 parts by weight, the dose of potassium chloride is 3 parts by weight, the dose of the bipolymer is 0.4 parts by weight, the dose of sodium polyacrylate is 2.5 parts by weight, the dose of sodium bisulfite is 3 parts by weight, the dose of barite A is 200 parts by weight, and the dose of barite B is 50 parts by weight.

Result: a deep-well polysulfonate drilling fluid D1 is obtained, and the temperature-resistant property of it is as high as 220° C.; other properties are shown in Table 2.

Comparative Example 2

A deep-well polysulfonate drilling fluid is prepared with the same method as described in the example 2, but the doses of the additive are different, especially the total dose of the organic additives are more; specifically, based on 100 parts by weight of clean water, the dose of bentonite is 6 parts by weight, the dose of sodium carbonate is 0.3 parts by weight, the dose of sulfomethylated phenolic resin is 8.5 parts by weight, the dose of sulfonated lignite is 8.5 parts by weight, the dose of sodium chloride is 5 parts by weight, the dose of potassium chloride is 6.5 parts by weight, the dose of the terpolymer is 1.8 parts by weight, the dose of sodium polyacrylate is 5 parts by weight, the dose of sodium bisulfite is 5 parts by weight, the dose of barite A is 180 parts by weight, and the dose of barite B is 120 parts by weight.

Result: a deep-well polysulfonate drilling fluid D2 is obtained, and the temperature-resistant property of it is as high as 220° C.; other properties are shown in Table 2.

Comparative Example 3

A deep-well polysulfonate drilling fluid is prepared with the same method as described in the example 1, but another organic additive is added additionally; specifically, 8 wt % drilling fluid filtrate reducer AOBS/AA/polyhydroxylate grafted copolymer H11-4 from Shijiazhuang Hualai Dingsheng Technology Co., Ltd. is added additionally.

Result: a deep-well polysulfonate drilling fluid D3 is obtained, and the temperature-resistant property of it is as high as 220° C.; other properties are shown in Table 2 (properties of drilling fluid system aged at 220° C.).

TABLE 2

| No. | V | PV | YP | θ(10") | HTHP filtrate loss |
|---|---|---|---|---|---|
| Example 1 | 63 | 47 | 16 | 3 | 15 |
| Example 2 | 61 | 46 | 15 | 3 | 14.5 |
| Comparative Example 1 | 84 | 68 | 16 | 4 | 54 |
| Comparative Example 2 | 79 | 76 | 13 | 7 | 46 |
| Comparative Example 3 | 77 | 67 | 10 | 8 | 37 |

Note: AV is in unit of mPa·s, PV is in unit of mPa·s, YP is in unit of Pa, θ(10") is in unit of Pa, and HTHP filtrate loss is in unit of ml.

Note: AV is in unit of mPa·s, PV is in unit of mPa·s, YP is in unit of Pa, θ(10") is in unit of Pa, and HTHP filtrate loss is in unit of ml.

TABLE 3

| Formulation of drilling fluid | Experiment conditions | Recovered mass (g) | Recovery efficiency (%) |
|---|---|---|---|
| Clean water + 50 g red rock soil | 220° C./16 h | 6.23 | 12.46 |
| Drilling fluid system + 50 g red rock soil | 220° C./16 h | 48.08 | 96.16 |

Note: The red rock soil is red rock cuttings in Sichuan at 6-10 meshes, the recovery efficiency is recovery efficiency after sieved through a 40-mesh sieve; the results in the table are averages of experimental data obtained in two cycles of experiments.

Note: The red rock soil is red rock cuttings in Sichuan at 6-10 meshes, the recovery efficiency is recovery efficiency after sieved through a 40-mesh sieve; the results in the table are averages of experimental data obtained in two cycles of experiments.

As can be seen from the data in Table 2: the deep-well polysulfonate drilling fluids prepared in the examples 1-2 have 61-63 mPa·s apparent viscosity, 46-47 mPa·s plastic viscosity, 15-16 Pa yield point, θ(10")=3, and HTHP filtrate loss less than or equal to 15 ml;

The deep-well polysulfonate drilling fluid prepared in the comparative example 1 has 84 mPa·s apparent viscosity, plastic viscosity as high as 68 mPa·s, 16 Pa yield point, and θ(10″)=4 Pa; moreover, the most severe shortcoming is that the HTHP filtrate loss is as high as 54 ml, which may result in occurrence of complex downhole accidents easily;

The deep-well polysulfonate drilling fluid prepared in the comparative example 2 has 79 mPa·s apparent viscosity, plastic viscosity as high as 76 mPa·s, 13 Pa yield point, and θ(10″)=7 Pa; moreover, the most severe shortcoming is that the HTHP filtrate loss is as high as 46 ml, which may result in occurrence of complex downhole accidents easily;

The deep-well polysulfonate drilling fluid prepared in the comparative example 3 has 77 mPa·s apparent viscosity, plastic viscosity as high as 67 mPa·s, 10 Pa yield point, and θ(10″)=8 Pa; moreover, the most severe shortcoming is that the HTHP filtrate loss is as high as 37 ml, which may result in occurrence of complex downhole accidents easily.

As can be seen from the data in Table 3: the rolling recovery efficiency of the deep-well polysulfonate drilling fluid prepared in the example 1 is as high as 96.92%, which indicates that the drilling fluid has a favorable inhibition property, and can effective inhibit clay hydration.

While the present invention is described above in detail in some preferred embodiments, the present invention is not limited to those examples. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A deep-well polysulfonate drilling fluid, comprising: water, bentonite, sodium carbonate, a sulfomethylated phenolic resin, sulfonated lignite, a halide salt, a filtrate reducer, sodium polyacrylate, sodium bisulfite, and barite,
    wherein, based on 100 parts by weight of water,
        the content of the bentonite is 3.5-5 parts by weight,
        the content of the sodium carbonate is 0.15-0.35 parts by weight,
        the content of the sulfomethylated phenolic resin is 6-8 parts by weight,
        the content of the sulfonated lignite is 6-8 parts by weight,
        the content of the halide salt is 7.5-12 parts by weight,
        the content of the filtrate reducer is 0.5-1.2 parts by weight,
        the content of the sodium polyacrylate is 0.8-1.7 parts by weight,
        the content of the sodium bisulfite is 3-5 parts by weight, and
        the content of the barite is 250-300 parts by weight.

2. The deep-well polysulfonate drilling fluid according to claim 1, wherein
    the content of the bentonite is 4-4.8 parts by weight,
    the content of the sodium carbonate is 0.2-0.24 parts by weight,
    the content of the sulfomethylated phenolic resin is 6.5-7.8 parts by weight,
    the content of the sulfonated lignite is 6.5-7.8 parts by weight,
    the content of the halide salt is 9-10.8 parts by weight,
    the content of the filtrate reducer is 0.75-0.9 parts by weight,
    the content of the sodium polyacrylate is 1.2-1.44 parts by weight,
    the content of the sodium bisulfite is 3.5-4.2 parts by weight, and
    the content of the barite is 260-290 parts by weight.

3. The deep-well polysulfonate drilling fluid according to claim 1, wherein the filtrate reducer is acrylamide/dimethyldiallyl ammonium chloride bipolymer, and/or acrylamide/dimethyldiallyl ammonium chloride/2-acrylamide-2-methyl propanesulfonic acid terpolymer; the halide salt is sodium chloride and/or potassium chloride; the barite is barite A having a grain size of 50 μm-70 μm and/or barite B having a grain size of 1 μm-1.2 μm.

4. The deep-well polysulfonate drilling fluid according to claim 3, wherein the filtrate reducer is a composition of acrylamide/dimethyldiallyl ammonium chloride bipolymer and acrylamide/dimethyldiallyl ammonium chloride/2-acrylamide-2-methyl propanesulfonic acid terpolymer, wherein a weight ratio of the acrylamide/dimethyldiallyl ammonium chloride bipolymer to the acrylamide/dimethyldiallyl ammonium chloride/2-acrylamide-2-methyl propanesulfonic acid terpolymer is 0.6:1 to 0.8:1.

5. The deep-well polysulfonate drilling fluid according to claim 3, wherein the halide salt is a composition of sodium chloride and potassium chloride, wherein a weight ratio of the sodium chloride to the potassium chloride is 0.6:1 to 0.96:1.

6. The deep-well polysulfonate drilling fluid according to claim 3, wherein the barite is a composition of barite A and barite B, and the weight ratio of the barite A to the barite B is 1:1 to 4:1.

7. The deep-well polysulfonate drilling fluid according to claim 1, wherein the pH of the deep-well polysulfonate drilling fluid is 8-9, and the density of the deep-well polysulfonate drilling fluid is 2.30 g/cm$^3$-2.45 g/cm$^3$.

8. A method for preparing a deep-well polysulfonate drilling fluid, comprising the following steps:
    (1) mixing bentonite and sodium carbonate through a first mixing process and then treating the mixture by prehydration; (2) mixing the mixture obtained by prehydration in the step (1) with a filtrate reducer and sodium polyacrylate through a second mixing process, and then mixing the resultant mixture with a halide salt and sodium bisulfite through a third mixing process; (3/mixing the mixture obtained in the step (2) with sulfomethylated phenolic resin and sulfonated lignite through a fourth mixing process; wherein, based on 100 parts by weight of water, the dose of the bentonite is 3.5-5 parts by weight, the dose of the sodium carbonate is 0.15-0.35 parts by weight, the dose of the sulfomethylated phenolic resin is 6-8 parts by weight, the dose of the sulfonated lignite is 6-8 parts by weight, the dose of the halide salt is 7.5-12 parts by weight, the dose of the filtrate reducer is 0.5-1.2 parts by weight, the dose of the sodium polyacrylate is 0.8-1.7 parts by weight, the dose of the sodium bisulfite is 3-5 parts by weight, and the dose of the barite is 250-300 parts by weight.

9. The method according to claim 8, wherein, based on 100 parts by weight of water,
    the dose of the bentonite is 4-4.8 parts by weight,
    the dose of the sodium carbonate is 0.2-0.24 parts by weight,
    the dose t of the sulfomethylated phenolic resin is 6.5-7.8 parts by weight,
    the dose t of the sulfonated lignite is 6.5-7.8 parts by weight,
    the dose of the halide salt is 9-10.8 parts by weight,
    the dose t of the filtrate reducer is 0.75-0.9 parts by weight, the dose t of the sodium polyacrylate is 1.2-1.44 parts by weight, the dose of the sodium bisulfite is 3.5-4.2 parts by weight, and the content of the barite is 260-290 parts by weight.

10. The method according to claim 8, wherein the filtrate reducer is acrylamide/dimethyldiallyl ammonium chloride bipolymer, and/or acrylamide/dimethyldiallyl ammonium chloride/2-acrylamide-2-methyl propanesulfonic acid terpolymer; the halide salt is sodium chloride and/or potassium chloride; the barite is barite A having a grain size of 50 μm-70 μm and/or barite B having a grain size of 1 μm-1.2 μm.

11. The method according to claim 10, wherein the filtrate reducer is a composition of acrylamide/dimethyldiallyl ammonium chloride bipolymer and acrylamide/dimethyldiallyl ammonium chloride/2-acrylamide-2-methyl propanesulfonic acid terpolymer, wherein a weight ratio of the acrylamide/dimethyldiallyl ammonium chloride bipolymer to the acrylamide/dimethyldiallyl ammonium chloride/2-acrylamide-2-methyl propanesulfonic acid terpolymer is 0.6:1 to 0.8:1.

12. The method according to claim 10, wherein the halide salt is a composition of sodium chloride and potassium chloride, wherein a weight ratio of the sodium chloride to the potassium chloride is 0.6:1 to 0.96:1.

13. The method according to claim 10, wherein the barite is a composition of barite A and barite B, wherein a weight ratio of the barite A to the barite B is 1:1 to 4:1.

14. The method according to claim 8, wherein, in step (1) the conditions of the first mixing process include: temperature: 50-70° C., stirring rate: 550-650 r/min., and time: 30-45 min.;

the conditions of the prehydration treatment include: temperature: 50-70° C., stirring rate: 550-650 r/min., and time: 23-25 h;

wherein in step (2) the conditions of the second mixing process include: temperature: 60-70° C., stirring rate: 950-1,000 r/min., and time: 50-70 min.; and the conditions of the third mixing process include: temperature: 60-70° C., stirring rate: 550-650 r/min., and time: 50-70 min.;

wherein, in step (3) the conditions of the fourth mixing process include: temperature: 60-70° C., stirring rate: 550-650 r/min., and time: 30-40 min.

15. The method according to claim 8, further comprising stirring at a rate of 500-1,100 r/min. during at least one mixing process.

16. The method according to claim 15, wherein the stirring rate is 550-1,000 r/min.

\* \* \* \* \*